(12) United States Patent
Maurice et al.

(10) Patent No.: US 10,005,694 B2
(45) Date of Patent: Jun. 26, 2018

(54) TWO COMPONENT SYNTHETIC WATER RETENTION AGENT AND RHEOLOGY MODIFIER FOR USE IN CEMENTS, MORTARS AND PLASTERS

(71) Applicants: Rohm and Haas Company, Philadelphia, PA (US); Dow Global Technologies LLC, Midland, MI (US)

(72) Inventors: Alvin M. Maurice, Lansdale, PA (US); Thomas Oswald, Galveston, TX (US); Michael J. Radler, Saginaw, MI (US); Hongwei Shen, Holmdel, NJ (US); Wei-Wen Tsai, Philadelphia, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 0 days. days.

(21) Appl. No.: 15/521,691

(22) PCT Filed: Oct. 16, 2015

(86) PCT No.: PCT/US2015/055875
§ 371 (c)(1),
(2) Date: Apr. 25, 2017

(87) PCT Pub. No.: WO2016/069289
PCT Pub. Date: May 6, 2016

(65) Prior Publication Data
US 2017/0247293 A1    Aug. 31, 2017

Related U.S. Application Data

(60) Provisional application No. 62/073,366, filed on Oct. 31, 2014.

(51) Int. Cl.
| | |
|---|---|
| C04B 24/26 | (2006.01) |
| C04B 28/04 | (2006.01) |
| C04B 28/14 | (2006.01) |
| C04B 40/00 | (2006.01) |
| C09K 8/467 | (2006.01) |
| C04B 24/20 | (2006.01) |
| C04B 28/02 | (2006.01) |
| C08F 8/00 | (2006.01) |
| C08F 20/28 | (2006.01) |
| C04B 103/00 | (2006.01) |
| C04B 103/46 | (2006.01) |
| C04B 111/00 | (2006.01) |
| C04B 103/44 | (2006.01) |

(52) U.S. Cl.
CPC .......... *C04B 24/2647* (2013.01); *C04B 24/20* (2013.01); *C04B 24/2629* (2013.01); *C04B 28/02* (2013.01); *C04B 28/04* (2013.01); *C04B 28/14* (2013.01); *C04B 40/0042* (2013.01); *C08F 8/00* (2013.01); *C08F 20/28* (2013.01); *C09K 8/467* (2013.01); *C04B 2103/0062* (2013.01); *C04B 2103/44* (2013.01); *C04B 2103/46* (2013.01); *C04B 2111/00637* (2013.01)

(58) Field of Classification Search
CPC . C04B 24/20; C04B 24/2629; C04B 24/2647; C04B 28/04; C04B 28/14; C04B 40/0042; C08F 8/00; C09K 8/467
See application file for complete search history.

(56) References Cited

U.S. PATENT DOCUMENTS

| | | |
|---|---|---|
| 1,971,662 A | 8/1934 | Schmidt et al. |
| 2,434,179 A | 1/1948 | Sharkey |
| 2,844,570 A | 7/1958 | Ernest |
| 2,844,571 A | 7/1958 | Broderick |
| 2,941,988 A | 6/1960 | Ernest |
| 3,052,652 A | 9/1962 | Halpern |
| 3,079,337 A | 2/1963 | Turbak et al. |
| 3,099,646 A | 7/1963 | Frank et al. |
| 3,385,815 A | 5/1968 | Toshihiko |
| 4,471,100 A * | 9/1984 | Tsubakimoto ............ C02F 5/10 525/367 |
| 4,933,378 A | 6/1990 | Kucera et al. |
| 5,105,885 A | 4/1992 | Bray et al. |
| 5,340,860 A | 8/1994 | Brake et al. |
| 5,705,553 A | 1/1998 | Kuropka |
| 6,180,689 B1 | 1/2001 | Moulin |

(Continued)

FOREIGN PATENT DOCUMENTS

| | | | |
|---|---|---|---|
| CN | 102557517 A * | 7/2012 | ............. C04B 24/38 |
| EP | 1326787 A2 | 7/2003 | |

*Primary Examiner* — John E Uselding

(57) ABSTRACT

The present invention provides compositions useful as a replacement for cellulose ether in cement, plaster or mortar compositions comprising i) nonionic or substantially nonionic vinyl or acrylic brush polymers having pendant or side chain polyether groups, and having a relative weight average molecular weight of from 140,000 to 50,000,000 g/mole, and ii) aromatic cofactors containing one or more phenolic groups, such as catechol tannins, phenolic resins, polyphenolics, and napthhols or, in combination, one or more aromatic groups with at least one sulfur acid group, such as naphthalene sulfonate aldehyde condensate polymers, poly (styrene-co-styrene sulfonate) copolymers, and lignin sulfonates, preferably branched cofactors, including phenolic resins, aldehyde condensate polymers and lignin sulfonates. The compositions may comprise a dry powder blend of i) and ii), one dry powder of both i) and ii), or an aqueous mixture.

12 Claims, No Drawings

(56) References Cited

U.S. PATENT DOCUMENTS

| | | | |
|---|---|---|---|
| 6,579,953 | B1 | 6/2003 | Gotsche et al. |
| 6,586,566 | B1 | 7/2003 | Hofmann et al. |
| 6,608,159 | B2 | 8/2003 | Fenchl et al. |
| 7,202,319 | B2 | 4/2007 | Spindler et al. |
| 7,375,163 | B2 | 5/2008 | Schober et al. |
| 7,803,873 | B2 | 9/2010 | Wagman |
| 2002/0198292 | A1* | 12/2002 | Kayser .................. C08F 8/00 524/2 |
| 2004/0072939 | A1 | 4/2004 | Cornman et al. |
| 2004/0211342 | A1 | 10/2004 | Sprouts et al. |
| 2006/0142499 | A1 | 6/2006 | Guntherberg et al. |
| 2007/0083020 | A1 | 4/2007 | Schinabeck et al. |
| 2011/0054081 | A1 | 3/2011 | Dierschke et al. |
| 2011/0305915 | A1 | 12/2011 | Dupont et al. |

\* cited by examiner

TWO COMPONENT SYNTHETIC WATER RETENTION AGENT AND RHEOLOGY MODIFIER FOR USE IN CEMENTS, MORTARS AND PLASTERS

The present invention relates to two component synthetic polymer compositions for use as replacements for cellulose ethers in cement admixture and dry mix compositions. More particularly, it relates to compositions comprising i) nonionic or substantially nonionic vinyl or acrylic brush polymers having pendant or side chain polyether groups, preferably, alkoxy poly(alkylene glycol) groups, and ii) one or more aromatic cofactors, such as poly(naphthalene sulfonate) aldehyde resins, as well as to methods of making them. Finally, it relates to methods of using the compositions in cement or concrete admixtures or dry mix compositions.

Cellulosics, including cellulose ethers, are well known as viscosity modifying agent (VMAs) additives for their thickening and water retention properties after the introduction of water to them. They are used in concrete mixtures, for example, for cementing well casings used for oil and gas production, and in mortars from dry mixes, such as cement based tile adhesives (CBTA). The thickening provided by a cellulose ether relies on its nature as a stiff polymer chain, including its high radius of gyration (Rg) and high persistence length (PL). Unlike water reducers and charged thickeners, cellulose ethers do not ball up in use but stay loosely coiled. Such thickening avoids flocculation or adsorption of the thickener onto alkaline particles in a cement or mortar; this phenomenon can be seen in the fact that cellulose ether polymers associate loosely with one another and retain water between them. This water retention enables wet application of mortar to an absorbing substrate, such as, for example, stone, stone structures, concrete brick or clay brick walls and proper setting before the mortar would dry out. Further, the thickening and water retention provided by a cellulose ether is dosage dependent; so viscosity of compositions containing cellulose ethers is highly controllable in use. However, cellulose ethers are known to delay the cement setting reaction. This delayed setting will result in lower strength properties.

Cellulose ethers are made from plant sources, e.g., wood pulp, by a very expensive multistep process; and, at present, the cost of a single manufacturing line used for making cellulose ethers ranges well into the hundreds of million dollars. Worldwide, only a handful of plants exist that can be used to make cellulose ethers. As demand for cellulose ethers for use in cement grows, especially in Asia, there is a need for increased supply. A material that can replace traditional cellulose ethers and that can be produced in less capital intensive manner would meet this need.

U.S. patent publication no. 2011/0054081, to Dierschke et al., discloses dispersant compositions comprising a phosphated structural unit containing polycondensation product and at least one dispersant component chosen from a branched comb polymer having polyether side chains, a naphthalene sulfonate formaldehyde condensate and melamine sulphonate-formaldehyde condensates. The compositions find use in hydraulic binder admixtures as water reducers which don't excessively delay setting. The disclosure provides examples only of commercially available comb polymers (see [0239]) and discloses no method for making a brush polymer or comb polymer that could reasonably find use as a viscosity modifier or a composition that could efficiently provide the water retention or thickening of a cellulose ether. Further, known superplasticizers cannot work as a substitute for cellulose ethers because they do not readily thicken cement admixtures or mortars; instead, superplasticizers lower the viscosity of ("fluidify"—see [0007]) cement admixtures and mortars and exhibit water reduction, not water retention.

The present inventors have sought to solve the problem of making a viscosity modifying agent that gives the thickening and water retention performance of cellulose ethers in cement and mortar, but without the capital expense of making cellulose ethers.

STATEMENT OF THE INVENTION

1. In accordance with the present invention, compositions useful as replacements for cellulose ether in cement, plaster or mortar compositions comprise i) one or more nonionic or substantially nonionic vinyl or acrylic brush polymers having pendant or side chain polyether groups, preferably, alkoxy poly(ethylene glycol) groups or polyethylene glycol groups, and having a relative weight average molecular weight (relative Mw) of from 140,000 to 50,000,000 g/mol, or, preferably, 250,000 or more, or, more preferably, 300,000 or more, or, preferably, 5,000,000 or less, or, even more preferably, 2,500,000 or less, and ii) one or more aromatic cofactors containing one or more phenolic groups or, in combination, one or more aromatic groups with at least one sulfur acid group, such as, for example, a poly(naphthalene sulfonate) formaldehyde condensate resin or styrene sulfonate (co)polymer. Preferably, the compositions contain no more than one formaldehyde condensate resin.

2. In accordance with the present invention as in the compositions of item 1, above, the weight ratio of the total amount of i) brush polymer solids to the total amount of ii) aromatic cofactor solids ranges from 1:0.25 to 1:10, or, preferably, from 1:1 to 1:5. Preferably, where the i) one or more brush polymers is an ethoxylated polyvinyl alcohol (ethoxylated PVOH) brush polymer the weight ratio the total amount of i) brush polymer solids to ii) aromatic cofactor solids ranges from 1:2 to 1:3; and, preferably, where the i) one or more vinyl or acrylic brush polymers has a relative weight average molecular weight above 750,000, the weight ratio the total amount of i) brush polymer solids to ii) aromatic cofactor solids ranges from 1:1 to 1:2.

3. In accordance with the present invention as in the compositions of items 1 or 2, above, wherein the ii) one or more aromatic cofactor is chosen from a naphthalene sulfonate aldehyde condensate polymer, such as a beta-naphthalene sulfonate formaldehyde condensate polymer, such as beta naphthalene sulfonate resin (BNS), a poly(styrene-co-styrene sulfonate) copolymer, lignin sulfonate, catechol tannins, phenolic resins, such as phenol formaldehyde resins, polyphenolics, napthhol, such as 2-naphthol, and mixtures thereof; preferably the aromatic cofactor is branched and, more preferably, is BNS.

4. The compositions of the present invention as in any one of items 1 to 3, above, wherein the average number of ether groups in the pendant or side chain polyether groups of the i) one or more brush polymers ranges from 1.5 to 100 ether groups, or, from 1.5 to 50 ether groups, or, preferably, from 3 to 40 ether groups, or, more preferably, from 5 to 25 ether groups.

5. The compositions of the present invention as in any one of items 1 to 4, above, wherein the i) one or more brush polymers is chosen from an ethoxylated polyvinyl alcohol; a homopolymer of a macromonomer a) having a pendant or side chain polyether group, such as polyethylene glycol (meth)acrylates, alkoxy polyethylene glycol (meth)acrylates, hydrophobic $C_{12}$ to $C_{25}$ alkoxy poly(alkylene glycol)

(meth)acrylates, and, preferably, polyethylene glycol (meth) acrylates and methoxy polyethylene glycol (meth)acrylates; a copolymer of one or more macromonomers a) and one or more monomers b) chosen from lower alkyl ($C_1$ to $C_4$) alkyl (meth)acrylates, preferably, methyl methacrylate, and ethyl acrylate; hydroxyalkyl (meth)acrylates, preferably, hydroxyethyl methacrylate; diethylenically unsaturated crosslinker monomers; and mixtures thereof.

6. The compositions of the present invention as in 5, above, wherein at least one of the one or more i) brush polymers is the copolymerization product of a monomer mixture of one or more macromonomers a) and one or more monomers b) wherein the copolymerization product of the one or more monomers b) is present in the brush polymer in the amount of up to 80 wt. %, or from 0.1 to 70 wt. %, or, preferably, from 0.1 to 40 wt. %, or, more preferably, from 0.1 to 20 wt. %, based on the weight of monomers used to make the i) brush polymer.

7. The compositions of the present invention as in any one of 1 to 6, above, wherein at least one of the i) one or more brush polymers has as copolymerization residues from 20 to 100 mole %, or from 30 to 99.9 mole, or from 40 to 70 mole % or, preferably, from 70 to 99.9 mole %, of pendant or side chain polyether group containing monomers, such as the copolymerization residue of a macromonomer a).

8. The compositions of the present invention as in any of 1 to 5, above, wherein at least one of the i) one or more brush polymers is an ethoxylated polyvinyl alcohol (ethoxylated PVOH) made from a reaction mixture of polyvinyl alcohol and ethylene oxide wherein ethylene oxide is present in the amount of from 20 to 98 wt. %, or, preferably, from 50 to 95 wt. %, or, more preferably, from 70 to 90 wt. %, based on the total weight of polyvinyl alcohol and ethylene oxide.

9. The compositions of the present invention as in any of 1 to 8, above, which comprise one dry powder, a dry powder blend of the i) one or more brush polymers as a powder and the ii) one or more aromatic cofactors as a powder, or an aqueous mixture.

10. The compositions as in any of 1 to 9, above, further comprising a hydraulic cement or plaster, wherein the total amount of the i) one or more brush polymer, as solids, ranges from 0.05 to 2 wt. %, or, preferably, from 0.1 to 1 wt. %, or, more preferably, from 0.2 to 0.5 wt. %, based on total cement solids.

11. The compositions as in any of 1 to 9, above, further comprising a hydraulic cement or plaster, wherein the total amount of the ii) one or more aromatic cofactors, as solids, ranges from 0.1 to 10 wt. %, or, preferably, from 0.2 to 5 wt. %, or, more preferably, from 0.2 to 2 wt. %, based on total solids.

12. The compositions in accordance with the present invention as in any of 9 to 11, above, comprising a dry mix of the one dry powder or the dry powder blend in with a dry hydraulic cement or plaster which is storage stable, such that addition of water forms a wet hydraulic cement, mortar or plaster and the dry mix does not block or clump on storage in a sealed container after 30 days at room temperature, 50% relative humidity and standard pressure.

13. In accordance with the present invention, methods for making the compositions as in any of items 1 to 9, above, comprise any one of:

drying or obtaining as a powder each of i) one or more brush polymers and the ii) one or more aromatic cofactors and mixing them to form a dry powder blend;

drying an aqueous mixture of the i) one or more brush polymers and the ii) one or more aromatic cofactors to form one dry powder, preferably, by spray drying them together; or, adding to an aqueous mixture of the i) one or more brush polymers and the ii) one or more aromatic cofactors in the form of a powder or an aqueous mixture.

14. In accordance with the present invention, methods for using the compositions as in any of items 1 to 9, above, comprise any one of a) or b):

a) adding to a wet hydraulic cement or plaster in the presence of shear the compositions in the form of any of a dry powder blend, one dry powder, an aqueous mixture, or mixtures thereof to form a cement, mortar or plaster, or b) first adding the i) one or more brush polymers in any form to the wet hydraulic cement, mortar or plaster and then adding ii) one or more aromatic cofactors, preferably, as an aqueous mixture to form a cement, mortar or plaster; and, then applying the thus formed cement, mortar or plaster to a substrate. The applied mortar may further be allowed to cure.

As used herein, the term "acrylic or vinyl polymer" refers to addition polymers of α, β-ethylenically unsaturated monomers, such as, for example, alkyl and hydroxyalkyl (meth)acrylates, vinyl esters, vinyl ethers, and polyethoxy group containing monomers, such as, for example, methoxypolyethylene glycol (meth)acrylate (MPEG(M)A) or polyethylene glycol (meth)acrylate (PEG(M)A) and allyl polyethylene glycol (APEG).

As used herein, the phrase "aqueous" includes water and mixtures composed substantially of water and water-miscible solvents, preferably, such mixtures having more than 50 wt. % water, based on the total weight of water and any water-miscible solvents.

As used herein, unless otherwise indicated, the term "average number of ether groups in the pendant or side chain polyether groups" of a brush polymer refers to the number of ether groups given in manufacturer's literature for an addition monomer such as a macromonomer a) or, in the case of an ethoxylated polyvinyl alcohol as indicated, the calculated average number of ether groups per alcohol group contained in the reaction mixture used to make the ethoxylated PVOH or the mass of ether group compounds actually reacted with the PVOH to make the ethoxylated PVOH, adjusted for the % or number of hydroxyl groups in the PVOH. As this is an average number, the actual number of ether groups in any one pendant or side chain polyether group will vary; and some brush polymer repeat units may have no side chain or pendant polyether group at all.

As used herein, the phrase "based on total solids" refers to weight amounts of any given ingredient in comparison to the total weight amount of all of the non-volatile ingredients in the aqueous composition, including synthetic polymers, natural polymers, acids, defoamers, hydraulic cement, fillers, other inorganic materials, and other non-volatile additives. Water, ammonia and volatile solvents are not considered solids.

As used herein, the term "based on the total weight of monomers" refers to the amount of a polymer or portion thereof compared to the total weight of addition monomers used to make the polymer, such as, for example, vinyl monomers.

As used herein, the term "copolymerization residue" of a given monomer refers to the polymerization product in a polymer that corresponds to that monomer. For example, the copolymerization residue of an mPEGMA (methoxypoly (ethyleneglycol) methacrylate) monomer is a polyethylene glycol side chain linked via an ester group to a methacrylic acid in polymerized form, i.e., having no double bond, situated within or at one end of an addition polymer backbone.

As used herein, the term "dry mix" refers to a dry composition that is free of added water and which contains unreacted inorganic powder, e.g., Portland cement powder, gypsum powder or pozzolanic powder, that would form a hydraulic cement or plaster or which would cure when wet. A dry mix may comprise dry organic components, like brush polymers containing pendant or side chain polyether groups, cellulose ethers, aromatic cofactors, polycarboxylate ethers, or water redispersible polymer powders (RDP).

As used herein, the phrase "hydraulic cement" means any inorganic material that cures in the presence of moisture, including, for example, cement, pozzolans, gypsum, geopolymers and alkaline silicates, such as water glass.

As used herein, the phrase "mortar" means a wet trowelable or pourable mixture containing hydraulic binder.

As used herein, the phrase "nonionic" with respect to brush polymers means that no monomer that was used to make the polymer has an anionic or cationic charge at a pH of from 1 to 14.

As used herein, the term "pendant" group refers to a side chain of a polymer or a group that is covalently linked to the backbone of a polymer and which is not an endgroup.

As used herein, unless otherwise indicated, the phrase "polymer" includes both homopolymers and copolymers from two or more than two differing monomers, as well as segmented and block copolymers.

As used herein, the term "storage stable" means that, for a given powder additive composition or dry mix, the powder will not block or clump on storage in a sealed container after 30 days at room temperature, 50% relative humidity and standard pressure.

As used herein, the term "substantially nonionic" means a polymer composition that at a pH of from 1 to 14 contains less than $10 \times 10^{-4}$ mol of added anionically or cationically charged monomers or polymer repeat units e.g., a saccharide unit in a cellulosic polymer or a monomer polymerization residue in an addition polymer, per gram of polymer, based on the total solids in the polymer, or, preferably, $5 \times 10^{-5}$ mol/g polymer or less. Such polymers are made by polymerizing a monomer mixture containing no anionically or cationically charged monomers. Anionic or cationic monomers that happen to be present as an impurity in nonionic monomers used in making the brush polymers of the present invention, such as macromonomer a) or monomer b), are not considered to be "added" anionically or cationically charged monomers.

As used herein, the term "sulfur acid group" means any of a sulfate, sulfonate, sulfite, and bisulfite group, such as a metabisulfite.

As used herein, the term "use conditions" refers to standard pressure and ambient temperatures at which a given composition may be used or stored.

As used herein, unless otherwise indicated, the term "relative weight average molecular weight" or "Mw" is relative molecular weight (Relative MW) as determined using an Agilent 1100 GPC system (Agilent Technologies, Lexington, Mass.) equipped with a differential reflective index detector set at a temperature of 40° C. Two columns in series at 40° C., one a TSKgel G2500PWXL with 7 μm hydrophilic polymethacrylate beads and the other a TSKgel GMPWXL with 13 μm hydrophilic polymethacrylate beads, were used for polymer separation. As the aqueous mobile phase, a 20 mM phosphate buffer aqueous composition at a pH adjusted to 7.0 using NaOH was used for separation with a flow rate of 1 mL/min. MW averages were determined using Varian Cirrus GPC/SEC Software Version 3.3 (Varian, Inc., Palo Alto, Calif.). Polyacrylic acid standards from American Polymer Standards (Mentor, Ohio) were used to calibrate the GPC system and generate a calibration curve. In determining Relative MW, the calibration curve was used for subsequent (Relative) MW calculation, for example, for assigning a weight average molecular weight to the ethoxylated PVOH polymers.

As used herein, unless otherwise indicated, the term "wt. %" or "wt. percent" means weight percent based on solids.

The singular forms "a," "an," and "the" include plural referents unless the context clearly dictates otherwise. Unless defined otherwise, the terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and independently combinable. Thus, for example, a disclosed range of a weight average molecular weight of from 140,000 to 50,000,000 g/mol, or, preferably, 250,000 or more, or, more preferably, 300,000 or more, or, preferably, 5,000,000 or less, or, even more preferably, 2,500,000 or less means any or all of such molecular weights ranging from 140,000 to 250,000, from 140,000 to 300,000, from 140,000 to 2,500,000, from 140,000 to 50,000,000, from 140,000 to 5,000,000, or, preferably, from 250,000 to 300,000, or, preferably, from 250,000 to 2,500,000, or, from 250,000 to 50,000,000, or, preferably, from 250,000 to 5,000,000, or, more preferably, from 300,000 to 2,500,000, or, preferably, from 300,000 to 5,000,000, or, from 300,000 to 50,000,000, or, preferably, from 2,500,000 to 5,000,000 or from 5,000,000 to 50,000,000.

Unless otherwise indicated, conditions of temperature and pressure are room temperature and standard pressure, also referred to as "ambient conditions". The aqueous binder compositions may be dried under conditions other than ambient conditions.

The present invention provides compositions that partly or wholly replace cellulose ethers as water retention agents and viscosifiers in hydraulic cement, e.g., cement, mortar and plaster, compositions. The brush copolymers of the present invention effectively complex with the aromatic cofactors of the present invention in a nonionic interaction that results in thickening and water retention in mortars, cements and plasters that is comparable to those same effects observed when the adding same amount of a cellulose ether. The vinyl or acrylic brush polymers have a high Mw and pendant or side chain polyether groups, such as polyethylene glycols, which complex with aromatic cofactors, such as beta-naphthalene sulfonate formaldehyde condensate polymer (BNS), poly(styrene-co-styrene sulfonate) copolymer, polyphenolics, such as phenol aldehyde condensates, and lignin sulfonate. Further, such brush polymers, like cellulose ethers, have minimal ionic adsorption behavior onto inorganic or hydraulic cement surfaces thereby enabling water retention in aqueous inorganic and hydraulic cement compositions. The resulting brush polymer and aromatic cofactor compositions in water have a very high solution viscosity at low concentration and provide high viscosity and effective water retention in mortars, plasters and cement admixtures without an undesirable amount of setting retardation. In fact, the compositions of the present invention exhibit in water a low shear solution viscosity similar to a hydroxypropyl methylcellulose (HPMC) material Methocel™ F75M cellulose ether (Dow, Midland, Mich.). In a conventional cement tile adhesive (CBTA) mortar formulation, the compositions provide equivalent mortar consistency and water retention similar to that of HPMC at the same dosage level. And the setting rate of the cement or mortar is retarded significantly less in the inventive compositions when compared to HPMC at the same dosage level. In addition, the synthetic vinyl or acrylic brush polymers of the present invention provide a more consistent product than cellulose ethers which, coming from a natural source material are highly variable in nature.

The cofactor of the present invention can be any compound, polymer or oligomer having one or more and up to 1,000,000, or up to 100,000, or, preferably, two or more, or, more preferably, three or more aromatic groups or phenolic groups, such as, for example, phenolic or naphtholic groups, wherein when the aromatic cofactor has aromatic groups other than phenolic groups it further contains at least one sulfur acid group. Preferably, the aromatic cofactor of the present invention has one or more aromatic group and at least one sulfur acid group, or, more preferably, two or more such combinations. These cofactors can include BNS, styrene sulfonate (co)polymers, and lignin sulfonates, as well as phenolic resins, tannins and naphthols.

The oligomeric or polymeric aromatic cofactors of the present invention have aromatic or phenolic groups on from 10 to 100%, or, preferably, from 30 to 100%, or, more preferably, from 50 to 100% or from 60 to 100% of the repeat units of the oligomer or polymer. For example, each of a phenol formaldehyde resin or a naphthalene sulfonate aldehyde resin (e.g., BNS) is considered a homopolymer or oligomer having, respectively, phenolic groups or aromatic groups in 100% of its repeating units. Preferably, in oligomers or polymers having aromatic and sulfur acid groups in combination, more than 30 wt. %, or, preferably, more than 50 wt. %, of the aromatic groups are accompanied by a sulfur acid group, such as, for example, poly(styrene-co-styrene sulfonate) copolymers which are the copolymerization product of more than 30 mole % of styrene sulfonate, based on the total number of moles of vinyl monomers used to make the copolymer.

The aromatic cofactor may be linear, as in styrene sulfonate containing polymers, and is, preferably, branched, as in any condensate resin, such as naphthalene sulfonate aldehyde or phenol aldehyde condensates, tannins or lignin sulfonates.

Where the aromatic cofactor is linear, it preferably has a molecular weight of 600,000 to 10,000,000.

Suitable examples of aromatic cofactors are commercially available, including Melcret™ 500 powder (BASF, Ludwigshafen, Del.) and the liquid version thereof, Melcret™ 500 L (BASF) liquid. Both are BNS polymers or oligomers.

The vinyl or acrylic brush polymers of the present invention can comprise any such polymers having pendant or side chain polyether groups, preferably, polyethylene glycols or alkoxy poly(ethylene glycols). The pendant or side chain polyether groups help the polymers to be water soluble or at the least to be water dispersible. Such pendant or side chain polyether groups can be, for example, polyalkylene glycol side chains terminated with hydroxyl, methyl, ethyl or any other non-ionic group. The side chains can be pure alkylene glycols (EO, PO, BO, etc.) or mixtures thereof. Suitable pendant or side chain polyether groups may be chosen from polyalkylene glycols, such as polyethylene glycol, polypropylene glycol, polybutylene glycols or copolyethers of two or more thereof; alkoxy poly(alkylene glycol)s, such as methoxy poly(alkylene glycol)s, ethoxy poly(alkylene glycol)s and their combination.

Preferably, the average number of ether groups in the pendant or side chain polyether groups in the brush polymer of the present invention ranges from 3 to 25, or, more preferably, from 5 to 15 ether groups or alkylene glycol groups.

Preferably, the ether groups in the pendant or side chain polyether groups of the brush polymers of the present invention are ethoxy ($-CH_2CH_2O-$) groups.

The backbone of the vinyl or acrylic brush polymers of the present invention consists of repeating units of acrylic or methacrylic acid esters or vinyl esters; however, the repeating units are not limited to these. The vinyl or acrylic brush polymers of the present invention can also can be synthesized using of any other unsaturated monomers, such as vinyl-, allyl-, isoprenyl-groups.

An example of an acrylic brush polymer having pendant or side chain polyether groups is a (co)polymer of an acrylate or acrylamide macromonomer a) having a pendant or side chain polyether group. Such macromonomers a) have large pendant hydrophilic groups, such as polyethylene glycol, that can help the polymers to be water soluble or at the least to be water dispersible.

Suitable acrylic brush polymers having pendant or side chain polyether groups are the polymerization product of a) from 20 to 100 wt. %, or 40 to 70 wt. %, or, preferably, 30 wt. % or more, or, preferably, up to 80 wt. %, or, more preferably, from 70 to 99.9 wt. %, such as 90 wt. % or more, based on the total weight of the monomers used to make the polymer, of one or more macromonomer a) having a pendant polyether group, such as polyethylene glycol (meth)acrylates, alkoxy polyethylene glycol (meth)acrylates, hydrophobic $C_{12}$ to $C_{25}$ alkoxy poly(alkylene glycol)s, and, preferably, polyethylene glycol (meth)acrylates and methoxy polyethylene glycol (meth)acrylates and b) as the remainder of the monomers used to make the polymer, one or more vinyl or acrylic monomer b).

Suitable macromonomers a) for making the acrylic brush polymers of the present invention may be any macromonomer having a poly(alkylene glycol) with the desired number of ether or alkylene glycol units, such as, for example, a polyethylene glycol (meth)acrylate or its corresponding (meth)acrylamide having from 2 to 50 ethylene glycol units, polypropylene glycol (meth)acrylate or its corresponding (meth)acrylamide having from 2 to 50 propylene glycol units, a $C_{12}$ to $C_{25}$ alkoxy polyethylene glycol (meth)acrylate or its corresponding (meth)acrylamides having from 2 to 50 ethylene glycol units and, a $C_{12}$ to $C_{25}$ alkoxy polypropylene glycol (meth)acrylate or its corresponding (meth) acrylamide having from 2 to 50 propylene glycol units, polybutylene glycol (meth)acrylate or its corresponding (meth)acrylamide having from 2 to 50 total alkylene glycol units, polyethylene glycol-polypropylene glycol (meth)acrylate or its corresponding (meth)acrylamide having from 2 to 50 total alkylene glycol, polyethylene glycol-polybutylene glycol (meth)acrylate or its corresponding (meth)acrylamide having from 2 to 50 total alkylene glycol units, polypropylene glycol-polybutylene glycol (meth)acrylate or its corresponding (meth)acrylamide having from 2 to 50 total alkylene glycol units, polyethylene glycol-polypropylene glycolpolybutylene glycol (meth)acrylate or its corresponding (meth)acrylamide having from 2 to 50 total alkylene glycol units, methoxypolyethylene glycol (meth)acrylate or its corresponding (meth)acrylamide having from 2 to 50 ethylene glycol units, methoxypolypropylene glycol (meth) acrylate or its corresponding (meth)acrylamide having from 2 to 50 propylene glycol units, methoxypolybutylene glycol (meth)acrylate or its corresponding (meth)acrylamide having from 2 to 50 total alkylene glycol units, methoxypolybutylene glycol mono(meth)acrylate or its corresponding (meth)acrylamide having from 2 to 50 total alkylene glycol units, methoxypolyethylene glycol-polypropylene glycol (meth)acrylate or its corresponding (meth)acrylamide having from 2 to 50 total alkylene glycol units, methoxypolyethylene glycol-polybutylene glycol (meth)acrylate or its corresponding (meth)acrylamide having from 2 to 50 total alkylene glycol units, methoxypolypropylene glycol-polybutylene glycol (meth)acrylate or its corresponding (meth) acrylamide having from 2 to 50 total alkylene glycol units, methoxypolyethylene glycol-polypropylene glycol-polybutylene glycol (meth)acrylate or its corresponding (meth) acrylamide having from 2 to 50 total alkylene glycol units, ethoxypolyethylene glycol (meth)acrylate or its corresponding (meth)acrylamide having from 2 to 50 ethylene glycol units, polyethylene glycol (meth)allyl ether or monovinyl ether having from 2 to 50 ethylene glycol units, polypropylene glycol (meth)allyl ether or monovinyl ether having from 2 to 50 propylene glycol units, polyethylene glycol-polypropylene glycol (meth)allyl ether or monovinyl ether having from 2 to 50 total alkylene glycol units, polyethylene glycol-polybutylene glycol (meth)allyl ether or monovinyl ether having from 2 to 50 total alkylene glycol units, polypropylene glycol-polybutylene glycol (meth)allyl ether or monovinyl ether having from 2 to 50 total alkylene glycol units, methoxypolyethylene glycol (meth)allyl ether or monovinyl ether having from 2 to 50 ethylene glycol units, methoxypolypropylene glycol (meth)allyl ether or monovinyl ether having from 2 to 50 propylene glycol units, and the corresponding monoesters, monoamides, diesters and diamides of itaconic or maleic acids, or mixtures of any of the foregoing.

Preferably, the macromonomers a) used to make the vinyl or acrylic brush polymers of the present invention have pendant or side chain polyether groups with from 3 to 25 alkylene glycol or ether units or from 5 to 20 total ether units.

Preferably, the macromonomers a) used to make the vinyl or acrylic brush polymers of the present invention are methacrylate monomers.

More preferably, the macromonomers a) are chosen from poly(ethylene glycol) (meth)acrylate (PEG(M)A), methoxypoly(ethylene glycol) (meth)acrylate (MPEG(M)A), or their mixture, especially those having side chains with from 5 to 25 ethylene glycol units and, more preferably, from 7 to 15 ethylene glycol units.

The monomers b) used to make the acrylic brush polymers of the present invention may be chosen from lower alkyl ($C_1$ to $C_4$) alkyl (meth)acrylates, preferably, methyl methacrylate, and ethyl acrylate; hydroxyalkyl (meth)acrylates, preferably, hydroxyethyl methacrylate; diethylenically unsaturated crosslinker monomers, such as polyethylene glycol di(meth)acrylates, ethylene glycol-dimethacrylate, ethylene glycol diacrylate, allyl acrylate or allyl methacrylate; and their combination.

The i) brush polymers of the present invention may be crosslinked and may be made by copolymerization of the one or more macromonomers a) and any other monomers with from 0.01 to 5 wt. %, based on the total weight of monomers used to make the polymer, or, preferably, from 0.02 to 2 wt. %, of one or more diethylenically unsaturated crosslinker monomers, such as (poly)glycol di(meth)acrylates, like (poly)ethylene glycol dimethacrylates or (poly) ethylene glycol diacrylates; allyl acrylate or allyl methacrylate; or their combination.

Preferably, to insure that the vinyl or acrylic brush polymers of the present invention exhibit water retention and not water reduction, such polymers are substantially nonionic. Therefore, such vinyl or acrylic brush polymers are the polymerization product of less than 0.01 wt. % of any added ethylenically unsaturated carboxylic acid or salt monomer.

The vinyl or acrylic brush polymers of the present invention can be made via conventional free radical polymerization, such as shot polymerization wherein the monomer reactants are added to a reaction vessel all at one time.

Further, vinyl or acrylic brush polymers having two or more branches may be made via aqueous initiation polymerization of a macromonomer a) in the presence of a di-ethylenically unsaturated comonomer, such as allyl methacrylate or a (poly)glycol di(meth)acrylate.

Preferably, to make high molecular weight vinyl or acrylic brush polymers, aqueous solution polymerization is conducted with a thermal initiator, such as a persulfate or a peracid.

Preferably, to make high molecular weight vinyl or acrylic brush polymers, polymerization is conducted in aqueous solution at a temperature of from 40 to 80° C., or, more preferably, 71° C. or less.

More preferably, to make high molecular weight vinyl or acrylic brush polymers, polymerization is conducted in aqueous solution with a thermal initiator, at a temperature of from 40 to 80° C., or, most preferably, 71° C. or less.

Most preferably, the highest molecular weight vinyl or acrylic brush polymers are polymerized in aqueous solution with a thermal initiator, at a concentration of 0.01 wt. % to 1 wt. %, based on the total weight of monomers (monomer solids) used to make the polymer, or, even more preferably, 0.08 wt. % or more.

In addition, vinyl or acrylic brush polymers may be made via organic solvent solution polymerization of monomer in the presence of each of i) a grafting substrate containing one, two or more than two initiating groups, such as, for example, a multi-functional initiator, like a polybromobenzyl molecule or a polybromoacetyl molecule, ii) a catalyst for polymerization starting from the grafting substrate, such as, for example, a metal bromide salt, such as CuBr, and iii) a solubilizing ligand for the catalyst, followed by removing the solvent. The brush polymers made using such methods have as many branches as the number of initiating groups on the grafting—from substrate. An example of such polymerization methods is disclosed in U.S. Pat. No. 7,803,873 B2, to Wagman. Such polymerization methods may employ, for example, a commercially available 1,1,1-Tris(2-bromoisobutyrloxymethyl)ethane (Sigma Aldrich, St. Louis, Mo.), having three initiating sites, i.e., the number of halides in the multi-functional initiator, in a bromide protected initiation polymerization. The halide may be substituted for with a chloride and/or iodide. Suitable grafting substrates may be made via condensation of a boronic acid, containing a pendant initiating site, described above, with a polyhydroxyl compound in the presence of base. Suitable catalysts for pairing a side chain with a grafting substrate for use in making such brush polymers may be metal halides of metals commonly used as polymerization catalysts, such as copper, iron, manganese, silver, platinum, vanadium, nickel, chromium, palladium, or cobalt, preferably, copper bromides or copper chlorides. Any solvent and unreacted monomer from an organic solvent polymer solution may be removed by vacuum distillation, preferably, by precipitation of the polymer into an incompatible solvent, followed by filtration.

The vinyl brush polymers of the present invention include ethoxylated polyvinyl alcohol (ethoxylated PVOH) brush copolymers which may be made by grafting ethylene oxide to hydrolyzed vinyl ester (co)polymers, such as hydrolyzed polyvinyl acetates. The hydrolyzed vinyl ester (co)polymer reactants may have a weight average molecular Mw of from 50,000 to 1,000,000 g/mol or, preferably, 100,000 or more, as reported in manufacturer's literature or as determined by gel permeation chromatography using polyvinyl alcohol standards.

Suitable methods for making the ethoxylated PVOH of the present invention may be found in, for example, U.S. Pat. No. 1,971,662A to Schmidt et al. and in U.S. Pat. No. 3,052,652A to Halpern et al., which discloses grafting in an aqueous suspension. Desirably, solvents or diluents are used wherein the PVOH is initially in a slurry and wherein the ethoxylated product is soluble as in U.S. Pat. No. 2,434,179A to Sharkey. Also, the ethoxylated PVOH brush polymer can be made by grafting pendant or side chain polyether groups in the presence of a suitable catalyst in an organic solvent solution as in U.S. Pat. No. 2,844,570A to Aubrey.

The partially hydrolyzed polyvinyl ester polymer may suitably be hydrolyzed to an extent of from 30 to 100%, or, 50% or more, or, preferably, from 85 to 100% of the total repeat units in the polyvinyl ester polymer. Lower levels of hydrolysis help keep the polyvinyl ester soluble in low boiling aprotic solvents useful for economical solution polymerization; hence, polyvinyl alcohols having a greater than 30% hydrolysis may also be ethoxylated in a slurry process with diluent such as xylene.

Preferably, the polyethoxylated polyvinyl alcohol of the present invention is a polyethoxylated polyvinyl alcohol comprising, in copolymerized form, vinyl acetate.

The ethoxylated PVOH brush polymer may have a relative Mw of from 140,000 to 1,000,000 or, preferably, 250,000 or more, or, more preferably, 350,000 or more.

If a higher weight average molecular weight polyethoxylated polyvinyl alcohol is desired, the resulting graft or reaction product can be dialyzed to remove lower molecular weight fractions. The grafting or ethoxylation reaction temperature may range from 120 to 190° C., or, preferably, from 140 to 170° C.

The partially hydrolyzed polyvinyl ester polymer for making the ethoxylated PVOH brush polymer of the present invention may suitable be hydrolyzed to an extent of from 30 to 100%, or, 50% or more, or, preferably, from 85 to 100% of the total repeat units in the polyvinyl ester polymer.

Suitable catalysts for use in the ethoxylation or grafting of hydrolyzed polyvinyl ester to an ethoxy side chain may include, for example, a methoxide such as sodium methoxide (NaOMe), potassium methoxide (KOMe); a hydride such as NaH; a double metal cyanide (DMC), such as those described in U.S. Pat. No. 6,586,566 to Hofmann et al.; alkylated metal catalysts, such as butyl lithium; or an alkali metal hydroxide.

Suitable amounts of catalyst may range from 100 ppm to 10,000 ppm (1 wt. %), based on total reactant and catalyst solids, or, preferably, from 200 to 1,000 ppm, or, preferably, 500 ppm or less.

Suitable solvents or carrier for grafting or ethoxylation may include, for example, aprotic polar solvents such as, for example, 2-methyl pyrrolidone, dimethyl formamide (DMF), and dimethyl sulfoxide (DMSO).

Where an organic solvent is used in ethoxylation or grafting, the hydrolyzed polyvinyl ester should contain 10 wt. % water or less, based on the weight of the polyvinyl ester polymer and the carrier or liquid phase, or, preferably, less than 1 wt. % water.

The grafting or ethoxylation reaction temperature may range from 80 to 190° C., or, preferably, from 120 to 170° C.

The polyethoxylated polyvinyl alcohol is preferably dried. Drying may be done by heating, preferably, drying in a vacuum oven or by an azeotropic method as described in the prior art. Methyl ethyl ketone (MEK) is preferably used as the solvent for azeotropic removal of water from the reactant polyvinyl alcohol (PVOH) used in making the brush polymer.

The vinyl or acrylic brush polymer compositions of the present invention can be used in wet or dry form.

Preferably, the vinyl or acrylic brush polymer of the present invention is formulated in dry form, preferably, by spray drying, to form a powder composition.

The aromatic cofactor can be used in wet or dry form and can be combined with the vinyl or acrylic brush polymers to make an additive composition.

The compositions may be used by admixing them with hydraulic binders and water to make plasters, cements, concrete or mortars. The composition of the present invention can be combined with cement, plaster or hydraulic cements in any manner so long as the aromatic cofactor is not added to wet cement, mortar or plaster prior to addition of the vinyl or acrylic brush polymer to the wet cement, mortar or plaster. In this sense, the compositions are two component compositions with the aromatic cofactor and the wet inorganic or hydraulic cement or plaster kept as two separate components. In use, the compositions of the present invention are preferably used dry, as a powder blend or one powder and added to a dry cement, plaster or dry mortar composition to make a dry mix. The dry mix is separate from and remains dry prior to addition of water to the cement, mortar or plaster to make a cement admixture, mortar, or wet plaster.

In the compositions of the present invention, the vinyl or acrylic brush polymers and the aromatic cofactors are combined such that in use the total amount of brush polymer dosage to the total solid content of the mortar, cement or plaster ranges from 0.05 to 2 wt. %, or, preferably, from 0.1 to 1 wt. %

In the compositions of the present invention, the vinyl or acrylic brush polymers and the aromatic cofactors are combined such that in use the total amount of aromatic cofactor dosage to the total solid content of the mortar, cement or plaster ranges from 0.1 to 5 wt. %, or, preferably, from 0.2 to 2 wt. %.

The compositions of the present invention may further comprise a cellulose ether, such as hydroxyethyl cellulose (HEC), hydroxypropyl methyl cellulose (HPMC) and/or hydroxyethyl methyl cellulose (NEMC).

The compositions of the present invention can contain, in addition, conventional additives in wet or dry form, such as, for example, cement setting accelerators and retarders, air entrainment agents or defoamers, shrinking agents and wetting agents; surfactants, particularly nonionic surfactants; spreading agents; mineral oil dust suppressing agents; biocides; plasticizers; organosilanes; anti-foaming agents such as dimethicones and emulsified poly(dimethicones), silicone oils and ethoxylated nonionics; and coupling agents such as, epoxy silanes, vinyl silanes and hydrophobic silanes.

EXAMPLES

The following examples serve to illustrate the present invention. Unless otherwise indicated, the preparations and test procedures are carried out at ambient conditions of temperature and pressure.

Acrylic Brush Polymer Synthesis Process:

All acrylic brush polymers in Examples 2 to 8 and 11-22 were synthesized in an aqueous solution shot polymerization process via free radical polymerization. Unless otherwise specified, a 1000 mL 4-neck round bottom reaction flask coupled with a thermo-couple, an overhead stirrer and a condenser was used for all polymer synthesis and a heating mantel was used to control reaction temperature. Unless stated otherwise, all chemicals used were from Sigma Aldrich (St. Louis, Mont.). All monomer reactants and a fixed amount of de-ionized water were charged first into the reactor. After the temperature rose to target temperature of 70° C., a controlled initial dosage of initiators was added and the temperature was held constant for two hours. After the two-hour polymerization, a second dosage of initiators was used to reduce the amount of residual monomers and the temperature was held constant for two hours. After the second two-hour reaction, the reactor was cooled down to near room temperature before taking the solution sample out of reactor for analysis and performance tests.

Polymer of Example 2 (See Table 1, Below)

A brush polymer was made via the Acrylic Brush Polymer Synthesis Process, above, wherein the reactants were 185 grams of de-ionized water and 10 grams of methoxypoly (ethylene glycol)$_{10.8}$ methacrylate (mPEGMA475) monomer all charged in the reaction flask. Temperature was set at 70±1° C. The initial dosage of initiator was 0.3 grams of 0.5 wt. % ammonium persulfate (APS) aqueous solution. The second dosage of initiator included 1 gram of 0.5 wt. % APS aqueous solution.

Polymer of Example 6 (See Table 1, Below)

A brush polymer was made via the Acrylic Brush Polymer Synthesis Process, above, in the same manner as the Polymer of Example 2, except the initial dosage of initiator was 2.0 grams of a 0.5 wt. % APS aqueous solution.

Polymer of Example 7 (See Table 1, Below)

A brush polymer was made via the Acrylic Brush Polymer Synthesis Process, above, in the same manner as the Polymer of Example 2, except 0.26 grams of ethylene glycol dimethacrylate (EGDMA) was added in the monomer mix before polymerization.

Polymer of Example 8 (See Table 1, Below)

A brush polymer was made via the Acrylic Brush Polymer Synthesis Process, above, wherein the reactants were 178 grams of de-ionized water and 21 grams of methoxy(polyethylene glycol)$_{17.05}$ methacrylate (mPEGMA750) monomer with 50 wt % active all charged in the reaction flask. Temperature was set at 70±1° C. The initial dosage of initiator was 0.42 grams of 0.5 wt. % APS aqueous solution. The second dosage of initiator included 1.5 gram of 0.5 wt. % APS aqueous solution.

Ethoxylated PVOH Synthesis Process:

All equipment was made of 316 stainless steel. Each reaction was run in a 600 mL reactor (Tube, about 5.12 cm diameter) and fitted with cooling coils and stirrer; two impeller sets which run at 800 RPM, a 98% hydrolyzed PVOH, having a weight average molecular weight of about 88,000 g/mol (Selvol™ 350 polymer, Sekisui Chemicals America, Dallas, Tex.). For each reaction, the catalyst (solid KOMe) was weighed out in a positive pressure glove box flushed with $N_2$ gas, in an amount sufficient to give 300 ppm, based on solids at the end of reaction, or 0.1±0.05 g, and was placed in the reactor. The indicated amount of the PVOH was added to the reactor; and the indicated amount anhydrous 2-methyl pyrrolidone (biological grade Sigma Aldrich, St. Louis, Mo.) was added to the reactor by syringe. The reactor was capped with a plastic beaker and moved to a reactor bay, wherein the beaker was removed and the reactor slipped over the impellor/cooling tube set as quickly as possible to reduce incoming water vapor from the atmosphere. The reactor was then padded and depressurized 5 times with $N_2$ gas to remove air/water and all supply lines ($N_2$ and ethylene oxide (EO)) were purged as per normal procedure. A stirrer was started (800 RPM) and the reactor temperature raised to 130° C. When the temperature was stable, an aliquot of EO was added until the reactor reached target reactor pressure (0.34 MPa). The EO was added to maintain but not exceed a maximum operating pressure of 0.39 MPa (56 psi) at a feed rate of about 25 g/hr. and the amount of EO metered in was totalized as reaction proceeds.

Once the target EO amount was added, the reaction was stopped and any remaining EO was "digested" while maintaining the reactor temperature at 130° C.; the total time from initial addition of EO to the start of digestion was about 8 hrs. and digestion was allowed to continue overnight at 130° C. The reaction was stopped when a computer monitored pressure gauge indicated a drop in pressure of less than 0.00689 MPa (1 psi) in a 60 minute period by dropping the reactor temperature to 60° C. after a further delay of 60 minutes.

After reaction, any excess EO was removed (about 24 hrs. after the reaction started) by sparging with $N_2$ gas and the reactor was removed from the reactor bay.

In each example, the reaction product, a brown viscous (warm) liquid was removed from the reactor, which was washed with water. Some clear rubbery gel was observed at gas/liquid interface on reactor wall (~1 g of gel).

In each example, about 20 mL of the resulting ethoxylated PVOH was separated from solvent and byproducts and purified by dialysis against de-ionized water by placing it in a dialysis membrane tube with a MW cutoff of 3,500 g/mol (Thermo-Fischer Scientific, Nazareth, Pa.); the dialysis tube was placed into a 3.7854 L (1 gallon) jar filled with deionized water. Fresh deionized water was exchanged twice a day over a 4-day dialysis period. After a 4-day dialysis, an ethoxylated PVOH aqueous solution was obtained.

The average number of ether groups in the pendant or side chain polyether groups of the ethoxylated PVOH brush polymers in each of Examples 22-25 was determined by mass balance. After the 4-day dialysis, a given sample of the aqueous solution was dried and the amount of reacted ethylene oxide was calculated by subtracting the amount corresponding to the polyvinyl alcohol in the sample. Thus, if the starting reactants consisted of 21 g of material, of which 20 g were ethylene oxide solids and 1 g was PVOH solids, and if a 10% weight fraction sample of the ethoxylated PVOH product weighs 1.5 g, then the product will have 10% of 1 g or 0.1 g PVOH and the remainder or 1.4 g of reacted ethylene oxide; hence, adjusting for the proportion of hydroxyl groups in the PVOH, if 100% of the repeat units in the PVOH had a hydroxyl group, the ethoxylated PVOH would have an average of 14 ether groups per side chain (per hydroxyl group); if 50% of the repeat units in the PVOH had a hydroxyl group, the ethoxylated PVOH would have an average of 28 ether groups per side chain (per hydroxyl group). It is assumed that the dialysis membrane will not remove any PVOH reactant as the PVOH reactant weighs much more than 3,500 g/mole.

Polymer of Example 23

In this example, a brush polymer was made by the ethoxylated PVOH Synthesis Process, above, and the amount of PVOH placed in the reactor was 10 g as solids, the total amount of NMP added to the reactor was 190 g and the total target amount of EO supplied to the reactor was 100 g, thus giving 110 g product at 100% reaction. The reaction mixture if fully reacted would have given a copolymer wherein the average number of ether groups in the pendant or side chain polyether groups of the i) brush polymers is 10 ether groups, or, the weight ratio of ether group to PVOH reactants is 10:1; however, the observed product has an average number of 5 ether groups in the pendant or side chain polyether groups of the i) brush polymers by mass balance. The relative Mw of the resulting ethoxylated PVOH is reported in Table 1, below.

Polymer of Example 25

In this example, a brush polymer was made by the ethoxylated PVOH Synthesis Process, above, and the amount of PVOH placed in the reactor was 7.5 g as solids, the total amount of NMP added to the reactor was 143 g and the total target amount of EO supplied to the reactor was 150 g, thus giving 162.5 g product at 100% reaction. The reaction mixture if fully reacted would have given a copolymer wherein the average number of ether groups in the pendant or side chain polyether groups of the i) brush polymers is 20 ether groups, or, the weight ratio of ether group to PVOH reactants is 20:1; however, the observed product has an average number of 10 ether groups in the pendant or side chain polyether groups of the i) brush polymers. The relative Mw of the resulting ethoxylated PVOH is reported in Table 1, below.

Composition Solution Viscosity:

Viscosity and shear thinning behavior of a 1.5 wt. % aqueous solution of the indicated brush polymer was measured at 25° C. on Anton Paar MCR 301 viscometer (Ashland, Va.) equipped with high-throughput automated system. The brush polymers were dissolved in the indicated concentrations and stirred until the solution became homogeneous in deionized (DI) water. Viscosity was collected at a shear range of 0.1 to 400 Hz. In Tables 1, 3 and 5, below, BNS refers to sodium naphthalene sulfonate formaldehyde condensate (Spectrum Chemicals, New Brunswick, N.J.), PSS refers to poly(styrenesulfonic acid sodium salt, 1,000 kg/mol manufacturer reported molecular weight, Sigma-Aldrich, St. Louis, Mo.) and lignin sulfonate refers to sodium salt of ligninsulfonate (Fisher Scientific, Waltham, Mass.).

As shown in the Table 1, below, the compositions having vinyl or acrylic brush polymers of the present invention and the aromatic cofactor of give room temperature shear viscosities as a 1.5 wt. % polymer aqueous solution that is comparable to that of cellulose ethers. A dramatic multiple factor viscosity increase resulted when an aromatic cofactor was added to an acrylic brush polymer. As shown in Examples 3, 4 and 5, it does not matter which aromatic cofactor gets used; however, the BNS is preferable. As shown in Example 7, a crosslinked brush polymer gives the best thickening results and is preferred.

Application Testing:

All of the following tests were carried out based on the mortar formulation in Table 2, below. The mortar was made using the indicated materials by first preparing a drymix by combining all dry materials. After this, all the wet components like water, aqueous solutions of aromatic cofactor and brush polymers were combined in a mixing bowl and stirred until homogeneous. While mixing on mixing level one (low speed), the drymix was added to the mixing bowl and the resulting components were mixer for 30 seconds on level one and then for 30 seconds on level two (higher speed). The resulting wet mortar was allowed to rest for 90 seconds to dissolve soluble additives and was then mixed again for 60 seconds on level two.

TABLE 1

Solution Viscosity of Inventive Aqueous Compositions

| Example | Description | polymer Relative Mw (kg/mol) | viscosity at 0.5 Hz (cP)$^2$ | viscosity at 5.0 Hz (cP)$^2$ |
|---|---|---|---|---|
| 1* | 1.5 wt. % HPMC$^1$ (control) solution | 710 | 10260 | 4270 |
| 2* | 1.5 wt. % mPEGMA475 homopolymer solution | 2320 | 43 | 35 |
| 3 | 1.5 wt. % Example 2 polymer + 3.75 wt. % BNS | 2320 | 7720 | 2190 |
| 4 | 1.5 wt. % Example 2 polymer + 3.75 wt. % PSS | 2320 | 600 | 400 |
| 5 | 1.5 wt. % Example 2 polymer + 3.75 wt. % lignin sulfonate | 2320 | 400 | 300 |
| 6 | 1.5 wt. % mPEGMA475 polymer + 3.75 wt. % BNS | 1440 | 4090 | 970 |
| 7 | 1.5 wt. % crosslinked mPEGMA475 polymer + 3.75 wt. % BNS | >5,000 | 9920 | 2500 |
| 8 | 1.5 wt % mPEGMA750 polymer + 3.75 wt. % BNS | 1660 | 5600 | 1300 |
| 11 and 12 | mPEGMA500 homopolymer | 2240 | — | — |
| 14 | mPEGMA2000 homopolymer | 1070 | — | — |
| 16 | crosslinked mPEGMA475 polymer from Example 7 | >5,000 | — | — |
| 17 | mPEGMA475 homopolymer | 230 | | |
| 19 | 80 wt. % mPEGMA500-20 wt. % MMA copolymer | 150 | — | — |
| 20 | 94 wt. % mPEGMA500-6 wt. % HEMA copolymer | 1870 | — | — |
| 21 | 85 wt. % mPEGMA500-15 wt. % HEMA copolymer | 1630 | — | — |
| 22 | 72 wt. % mPEGMA500-28 wt. % HEMA copolymer | 350 | — | — |
| 23 and 24 | 5EO average per side chain ethoxylated PVOH | 300 | — | — |
| 25 and 26 | 10EO average per side chain ethoxylated PVOH | 720 | — | — |

$^1$Methocel ™ F75M hydroxypropyl methylcellulose ether (The Dow Chemical Company, Midland, MI);
$^2$Viscosity is taken from 1.5 wt. % aq. Solution of just polymer* -; denotes Comparative Example.

As shown in Tables 3 and 5, below, the performance of the indicated compositions of the present invention the polymers of the present invention gave a mortar consistency and water retention similar to that of hydroxypropyl methyl cellulose ether at the same concentration. The cement setting rate is significantly less reduced with the inventive compositions than it is with the cellulose ether. The performance was tested in the mortar formulation for water retention capability (according to DIN 18555-7:1987-11, Beuth Verlag GmbH, Berlin, Del., 1987) and mortar consistency (according to CE17.3 DIN EN 196-3:2009-2, Beuth Verlag, 2009). Acceptable values for water retention capability are 90% or more, or, preferably, 95% or more. Acceptable values for mortar consistency are 90% or more, or, preferably, 95% or more. In the formulation, the order of addition and the liquid form or solid form of additives was not important.

TABLE 2

Mortar Formulation For Acrylic Brush Polymers

| Material | Identity | Part (solids wt. %) |
|---|---|---|
| Cement | Portland Type I cement | 35.0 |
| Sand | Quartz Sand, 0.3 mm to 0.595 mm (mesh sieved) | 62.6 |
| Vinyl acetate-ethylene copolymer redispersible polymer powder | Additive for cement-based tile adhesives | 2.4 |
| Composition | Details indicated in Table 3, below | See Table 3, below |

TABLE 3

Mortar Performance

| Example | Description[2] | Water Retention | Mortar Consistency |
|---|---|---|---|
| 9* | 0 wt. % of any polymer | 73.3 | <80 |
| 10* | 0.4 wt. % polymer of Example 1 | 98.1 | 97.5 |
| 11A | 0.4 wt. % mPEGMA500 polymer of Example 11 + 0.4 wt. % BNS | 98.4 | 100 |
| 12A | 0.2 wt. % polymer of Example 11 + 0.2 wt. % BNS | 98 | 100 |
| 13A | 0.4 wt. % polymer of Example 6 + 0.4 wt. % BNS | 97.5 | 98.4 |
| 14A | 0.4 wt. % mPEGMA2000 polymer of Example 14 + 1 wt. % BNS | 91 | 85 |
| 15A | 0.4 wt. % polymer of Example 7 + 1 wt. % BNS | 98.7 | 95 |
| 16A | 0.4 wt. % crosslinked mPEGMA475 polymer of Example 16 + 1 wt. % BNS | 100 | 97.5 |
| 17A | 0.4 wt. % mPEGMA475 polymer of Example 17 + 1 wt. % PSS | 96.4 | 90 |
| 18A | 0.4 wt. % polymer of Example 2 + 0.2 wt. % PSS | 98 | 95 |
| 19A | 0.4 wt. % mPEGMA500-MMA copolymer of Example 19 + 0.2 wt. % PSS | 96.6 | 100 |
| 20A | 0.4 wt % 94% mPEGMA500-HEMA 6% copolymer of Example 20 + 0.4 wt. % BNS | 98.7 | 82.5 |
| 21A | 0.4 wt. % 85% mPEGMA500-15HEMA copolymer of Example 21 + 0.4 wt. % BNS | 98.1 | 82.5 |
| 22A | 0.4 wt. % 72% mPEGMA500-28HEMA copolymer of Example 22 + 0.4 wt. % BNS | 98.8 | 80 |

[1]Methocel ™ F75M hydroxypropyl methylcellulose ether (The Dow Chemical Company, Midland, MI);
[2]All wt. %s are of solids and are based on total cement solids.
*denotes Comparative Example.

As shown in Table 3, above, all of the compositions of the present invention gave water retention values similar to that of hydroxypropyl methylcellulose ether (HPMC). The compositions of the present invention in Examples 11A-13A, 15A-16A, and 18A gave mortar consistency values similar to that of hydroxypropyl methylcellulose ether (HPMC); this shows that compositions comprising the brush polymers and cofactors of the present invention will develop good mortar consistency. Even the low molecular weight brush copolymer composition in Example 17A gives an acceptable water retention value. The Example 14A composition having a brush polymer with about 44 ether groups in the side chain macromonomer a) and about 44 ether groups on average in each side chain (it is a homopolymer) gives acceptable water retention; however, the average number of ether groups on the side chain of that brush polymer is higher than the preferred such average number.

Ethoxylated PVOH brush polymer Application Testing:

In a CBTA mortar formulation using the indicated brush polymer and cofactor composition indicated from Table 5, below, and the mortar indicated in Table 4, below, the compositions of the present invention were mixed in the form of an aqueous solution of brush polymer cofactor composition with the indicated cement, sand and cement additive dry mix. Mortar water content varies from 20 to 21.5 wt. % of cement solids.

TABLE 4

Mortar Formulation For Vinyl Brush Polymers

| Material | Identity | Parts (wt. % solids) |
|---|---|---|
| Cement | Portland Type I cement | 35.0 |
| Sand | Quartz Sand, 0.3 mm to 0.595 mm (mesh sieved) | 62.6 |
| Vinyl acetate-ethylene copolymer redispersible polymer powder | Additive for cement-based tile adhesives | 2.4 |
| Composition | Details indicated in Table 5 | See Table 5 |

TABLE 5

Mortar Performance

| Example | Description[2] | Water Retention (%) | Shear Stability |
|---|---|---|---|
| 9* | 0 wt. % polymer | 73.3 | <80 |
| 10* | 0.4 wt. % Control F75M[1] | 98.1 | 97.5 |
| 23A | 0.2 wt. % 5EO ethoxylated PVOH + 0.2 wt. % BNS | 99.3 | 97.5 |
| 24A | 0.15 wt. % 5EO ethoxylated PVOH + 0.25 wt. % BNS | 97.3 | <80 |
| 25A | 0.2 wt. % 10EO ethoxylated PVOH + 0.2 wt. % BNS | 94.6 | <80 |
| 26A | 0.15 wt. % 10EO ethoxylated PVOH + 0.25 wt. % BNS | 94.6 | <80 |

[1]Methocel ™ F75M hydroxypropyl methylcellulose ether (The Dow Chemical Company, Midland, MD;
[2]All material amounts are solids, based on cement solids;
*denotes Comparative Example.

As shown in Table 5, above, all of the mortar compositions having additives of the present invention gave water retention values similar to that of hydroxypropyl methylcellulose ether (HPMC). This shows that the ethoxylated PVOH of the present invention behaves like a cellulose ether when combined with an aromatic cofactor of the present invention.

We claim:

1. A composition useful as a replacement for cellulose ether in cement, plaster or mortar compositions comprising i) one or more crosslinked vinyl brush polymers having pendant or side chain polyether groups, which at a pH of from 1 to 14 contains less than $10 \times 10^{-4}$ mol of added anionically or cationically charged monomers or polymer repeat units, and having a relative weight average molecular weight (relative Mw) of from 250,000 to 50,000,000 g/mol, ii) one or more aromatic cofactors containing one or more phenolic groups or, in combination, one or more aromatic groups with at least one sulfur acid group.

2. The composition as claimed in claim 1, wherein the weight ratio of the total amount of i) brush polymer solids to the total amount of ii) aromatic cofactor solids ranges from 1:0.5 to 1:10.

3. The composition as claimed in claim 1, wherein the ii) one or more aromatic cofactor is chosen from a naphthalene sulfonate aldehyde condensate polymer, a poly(styrene-co-styrene sulfonate) copolymer, lignin sulfonate, catechol tannins, phenolic resins, polyphenolics, napthol, and mixtures thereof.

4. The composition as claimed in claim 1, wherein the i) one or more vinyl brush polymers has a relative weight average molecular weight of from 250,000 to 5,000,000 g/mol.

5. The composition as claimed in claim 1, wherein the i) one or more vinyl brush polymers has a pendant or side chain polyether group chosen from an alkoxy poly(ethylene glycol) group or a polyethylene glycol group.

6. The composition as claimed in claim 1, wherein the average number of ether groups in the pendant or side chain polyether groups of the i) one or more brush polymers ranges from 1.5 to 50 ether groups.

7. The composition as claimed in claim 1, wherein the i) one or more brush polymers is chosen from a polyethoxylated polyvinyl alcohol; a homopolymer of a macromonomer a) having a pendant or side chain polyether group; a copolymer of one or more macromonomers a) and one or more monomers b) chosen from $C_1$ to $C_4$ alkyl (meth)acrylates, hydroxyalkyl (meth)acrylates, diethylenically unsaturated crosslinker monomers and mixtures thereof.

8. The composition as claimed in claim 7, wherein at least one i) brush polymer is the copolymerization product of one or more macromonomers a) and one or more monomers b) and the total copolymerization product of monomers b) is present in the amount of from 0.1 to 40 wt. % of the i) brush polymer, based on the weight of monomers used to make the i) brush polymer.

9. The composition as claimed in claim 1, comprising any of:
one dry powder;
a dry powder blend of the i) one or more brush polymers as a powder and the ii) one or more aromatic cofactors as a powder; or,
an aqueous mixture.

10. The composition as claimed in claim 1, further comprising a hydraulic cement or plaster, wherein the total amount of the ii) one or more aromatic cofactors, as solids, ranges from 0.1 to 10 wt. %, based on total cement solids.

11. A method for using the composition as claimed in claim 1, comprising any one of:
a) adding to a wet hydraulic cement or plaster in the presence of shear to the compositions in the form of a dry powder blend, one dry powder, an aqueous mixture, or mixtures thereof to form a cement, mortar or plaster, or;
b) first adding the i) one or more brush polymers in any form to a wet hydraulic cement, mortar or plaster and then adding ii) one or more aromatic cofactors in the presence of shear to form a cement, mortar or plaster; and then,
applying the thus formed cement, mortar or plaster to a substrate.

12. The composition of claim 1, wherein the vinyl brush polymer is an acrylic brush polymer.

* * * * *